(12) United States Patent
Ishikawa et al.

(10) Patent No.: US 10,712,557 B2
(45) Date of Patent: Jul. 14, 2020

(54) HEAD-UP DISPLAY DEVICE

(71) Applicant: NIPPON SEIKI CO., LTD., Niigata (JP)

(72) Inventors: Ryoichi Ishikawa, Niigata (JP); Takanori Shigeno, Niigata (JP); Hiroyuki Furusawa, Niigata (JP); Mitsuaki Tsuboya, Niigata (JP)

(73) Assignee: NIPPON SEIKI CO., LTD., Niigata (JP)

( * ) Notice: Subject to any disclaimer, the term of this patent is extended or adjusted under 35 U.S.C. 154(b) by 155 days.

(21) Appl. No.: 16/079,008

(22) PCT Filed: Feb. 14, 2017

(86) PCT No.: PCT/JP2017/005264
§ 371 (c)(1),
(2) Date: Aug. 22, 2018

(87) PCT Pub. No.: WO2017/145860
PCT Pub. Date: Aug. 31, 2017

(65) Prior Publication Data
US 2019/0072765 A1    Mar. 7, 2019

(30) Foreign Application Priority Data

Feb. 24, 2016    (JP) .................. 2016-032566

(51) Int. Cl.
*G02B 27/01*    (2006.01)
*B60K 35/00*    (2006.01)

(52) U.S. Cl.
CPC .......... *G02B 27/0101* (2013.01); *B60K 35/00* (2013.01); *G02B 27/01* (2013.01);
(Continued)

(58) Field of Classification Search
CPC ............ G02B 27/0172; G02B 27/0101; G02B 2027/0178; G02B 27/017; G02B 27/0149;
(Continued)

(56) References Cited

U.S. PATENT DOCUMENTS

2005/0213859 A1* 9/2005 Kuroda .................. F16C 17/02
384/291
2014/0340851 A1* 11/2014 Yomogita ............ H05K 5/0017
361/725
(Continued)

FOREIGN PATENT DOCUMENTS

JP    03-100933 A    4/1991
JP    2005-256965 A    9/2005
(Continued)

OTHER PUBLICATIONS

International Search Report issued in corresponding International Patent Application No. PCT/JP2017/005264, dated May 16, 2017, with English Translation.

*Primary Examiner* — Collin X Beatty
*Assistant Examiner* — Grant A Gagnon
(74) *Attorney, Agent, or Firm* — McDermott Will & Emery LLP

(57) ABSTRACT

The present invention improves slidability between a moving part and a support member that supports the moving part. A head-up display device includes: a display that emits display light; a moving part on which a first sliding surface is formed; and a support member on which a second sliding surface that comes into contact with the first sliding surface is formed. The support member movably supports the moving part. The head-up display device displays vehicle information as virtual images from the display light. Linear protrusions and recesses are formed on the first sliding
(Continued)

surface and/or the second sliding surface following the trajectory along which the moving part moves.

5 Claims, 4 Drawing Sheets

(52) U.S. Cl.
CPC ..... *G02B 27/0149* (2013.01); *G02B 27/0179* (2013.01); *B60K 2370/1529* (2019.05); *B60K 2370/334* (2019.05); *G02B 2027/0154* (2013.01); *G02B 2027/0159* (2013.01)

(58) Field of Classification Search
CPC ............ G02B 2027/0123; G02B 27/01; G02B 2027/0187; G02B 2027/0118; G02B 2027/0127; G02B 2027/014; G02B 2027/015; G02B 27/0176; G02B 2027/011; G02B 2027/0138; G02B 27/0093; G02B 2027/0154; G02B 2027/0156; G02B 5/30; G02B 2027/0112; G02B 2027/0125; G02B 6/00; G02B 2027/0132; G02B 2027/0141; G02B 2027/0161; G02B 3/0006; G02B 2027/0134; G02B 2027/0152; G02B 2027/0169; G02B 2027/0174; G02B 26/10; G02B 5/02; G02B 5/18; G02B 2027/0121; G02B 25/001; G02B 27/0179; G02B 5/32; G02B 6/0031; G02B 17/0642; G02B 17/0663; G02B 2027/0114; G02B 2027/013; G02B 2027/0145; G02B 23/125; G02B 26/0833; G02B 27/0081; G02B 27/0103; G02B 27/141; G02B 27/144; G02B 27/283; G02B 5/04; G02B 5/10; G02B 6/0018; G02B 6/0035; G02B 6/0055; G02B 7/004; G02B 7/04; G02B 7/1822; G02B 17/006; G02B 17/02; G02B 17/0816; G02B 17/086; G02B 2027/012; G02B 2027/0147; G02B 2027/0159; G02B 2027/0167; G02B 2027/0181; G02B 2027/0183; G02B 2027/0194; G02B 2027/0196; G02B 2027/0198; G02B 23/10; G02B 23/105; G02B 26/101; G02B 26/105; G02B 27/0006; G02B 27/0018; G02B 27/0025; G02B 27/0075; G02B 27/0189; G02B 27/022; G02B 27/1006; G02B 27/1073; G02B 27/1086; G02B 27/12; G02B 27/14; G02B 27/142; G02B 27/145; G02B 27/286; G02B 27/4205; G02B 27/4272; G02B 27/44; G02B 27/48; G02B 30/26; G02B 30/27; G02B 30/34; G02B 30/52; G02B 30/60; G02B 3/0037; G02B 3/0043; G02B 3/0056; G02B 3/08; G02B 3/12; G02B 5/0242; G02B 5/0257; G02B 5/0278; G02B 5/045; G02B 5/085; G02B 5/1842; G02B 5/1847; G02B 5/1861; G02B 5/205; G02B 5/22; G02B 6/0033; G02B 6/0046; G02B 6/005; G02B 6/0065; G02B 6/0076; G02B 6/10; G02B 6/124; G02B 6/34; G02B 7/002; G02B 7/005; G02B 7/007; G02B 7/022; G02B 7/026; G02B 7/1821; B60K 35/00; B60K 2370/1529; B60K 2370/334; B60K 2370/66; B60K 2370/67; B60K 2370/141; B60K 2370/146; B60K 2370/23; B60K 2370/333; B60K 2370/771; B60K 2370/777; B60K 2370/785
USPC .......................................................... 359/630
See application file for complete search history.

(56) References Cited

U.S. PATENT DOCUMENTS

2019/0139286 A1\* 5/2019 Shimoda ............ G02B 27/0101
2019/0361232 A1\* 11/2019 Nakamura ........... G02B 26/105

FOREIGN PATENT DOCUMENTS

| JP | 2010-230157 A | 10/2010 |
|----|---------------|---------|
| JP | 2012-189184 A | 10/2012 |
| JP | 2014-226961 A | 12/2014 |

\* cited by examiner (a)

(b)

HEAD-UP DISPLAY DEVICE

CROSS REFERENCE

This application is the U.S. National Phase under 35 U.S.C. § 371 of International Application No. PCT/JP2017/005264, filed on Feb. 14, 2017, which claims the benefit of Japanese Application No. 2016-032566, filed on Feb. 24, 2016, the entire contents of each are hereby incorporated by reference.

TECHNICAL FIELD

The present invention relates to a head-up display device including a moving part.

BACKGROUND ART

Patent Literature 1 describes, as a conventional head-up display device including a moving part, a device configured to rotate a reflecting mirror that reflects display light emitted by a display.

Also, Patent Literature 2 describes a head-up display device configured such that a combiner for receiving display light emitted by a display and displaying a virtual image is moved into the head-up display device and that after the combiner is moved, a cover member for preventing the entry of a foreign object into the head-up display device is moved and closed.

CITATION LIST

Patent Literature

Patent Literature 1: Japanese Unexamined Patent Application Publication No. 2010-230157
Patent Literature 2: Japanese Unexamined Patent Application Publication No. 2014-226961

SUMMARY OF THE INVENTION

Problems to be Solved by the Invention

However, there has been room for improvement on sliding performance of a sliding surface between each of these moving parts (the reflecting mirror, the combiner, and the cover member) and each of support members supporting the corresponding moving parts.

Means for Solving the Problem

A head-up display device according to the present invention includes: a display that emits display light; a moving part on which a first sliding surface is formed; and a support member on which a second sliding surface that makes contact with the first sliding surface is formed, the support member supporting the moving part so that the moving part is movable. The head-up display device is configured to display vehicle information as a virtual image from the display light. Recesses and protrusions that extend along a trajectory in which the moving part moves are formed on the first sliding surface and/or the second sliding surface.

In the head-up display device according to the present invention, the recesses and protrusions may be formed periodically at predetermined intervals in a direction perpendicular to the trajectory in which the moving part moves.

In the head-up display device according to the present invention, the recesses and protrusions may be configured such that an arithmetic average roughness in the direction perpendicular to the trajectory in which the moving part moves is below 10 μm.

In the head-up display device according to the present invention, the recesses and protrusions may be cutting marks or grinding marks.

In the head-up display device according to the present invention, a resin material may be injection-molded into a mold on which the cutting marks or the grinding marks are formed, and therefore the recesses and protrusions are formed.

Effect of the Invention

Sliding performance between a moving part and a support member supporting the moving part is improved.

MODE FOR CARRYING OUT THE INVENTION

A head-up display device H1 according to a first embodiment of the present invention and a head-up display device H2 according to a second embodiment of the present invention will be described below with reference to the accompanying drawings. In addition, in the descriptions, the right and left side indicates the right and left side based on an occupant in a vehicle and corresponds to an x-axis in the accompanying drawings. The front and back side indicates the front and back side based on the occupant in the vehicle and corresponds to a z-axis in the accompanying drawings. The upper and lower side indicates the upper and lower side based on the occupant in the vehicle and corresponds to a y-axis in the accompanying drawings.

First Embodiment

The head-up display device H1 is installed in the vehicle and is configured to project display light L on a windshield of the vehicle and display a virtual image forward of the windshield. For example, vehicle information such as the running speed or the engine speed of the vehicle, or a route guidance map is indicated as the virtual image.

Figure 1:
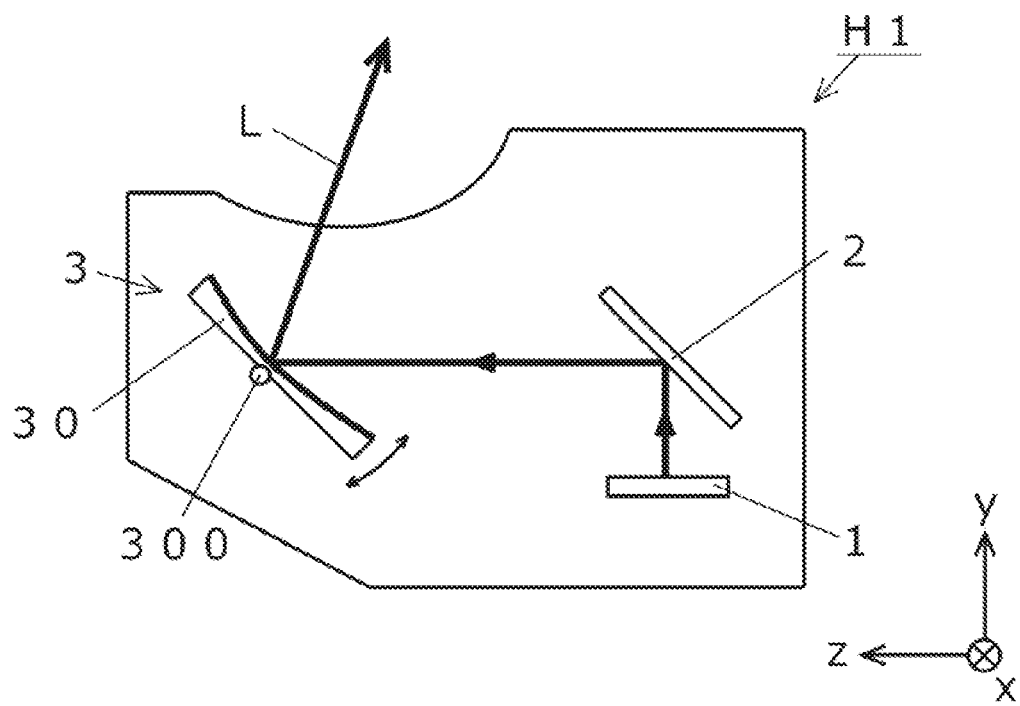
FIG. 1 is a schematic configuration diagram of a head-up display device H1 according to a first embodiment of the present invention.

As shown in FIG. 1, the head-up display device H1 includes a display 1 configure to emit the display light L and reflecting mirrors 2, 3 on which the display light L is reflected.

The display 1 is a liquid crystal display configured to emit the display light L that indicates the vehicle information.

The reflecting mirror 2 is a reflecting mirror obtained by forming, on a surface of a resin member such as polycarbonate (PC), a flat reflecting surface on which metal such as aluminum is vapor-deposited. The reflecting mirror 2 reflects the display light L emitted from the display 1 toward the reflecting mirror 3. The reflecting mirror 2 is configured so as to reflex the display light L in a housing of the head-up display device. Accordingly, the light path length of the display light L from the display 1 to the windshield elongates and therefore the virtual image can be displayed further forward of the windshield.

The reflecting mirror 3 is a reflecting mirror obtained by forming, on a surface of a base member 30 of a resin member such as polycarbonate, a reflecting surface of a concave surface on which metal such as aluminum is vapor-deposited. The reflecting mirror 3 reflects the display light L reflected by the reflecting mirror 2 toward the windshield. Since the reflecting surface of the concave surface is formed on the reflecting mirror 3, an effect that expands the display light L is achieved. As a result, even if the display 1 is configured as a relatively small and inexpensive display, the large virtual image can be displayed on the windshield.

The reflecting mirror 3 is a moving part configured to be rotatable about a rotation axis AX. The reflecting mirror 3 is rotated about the rotation axis AX extending in the x-axis direction and thereby the position in which the virtual image is displayed can be moved in the up to down direction (the y-axis direction) of the windshield in accordance with the eye level of the occupant.

Figure 2:
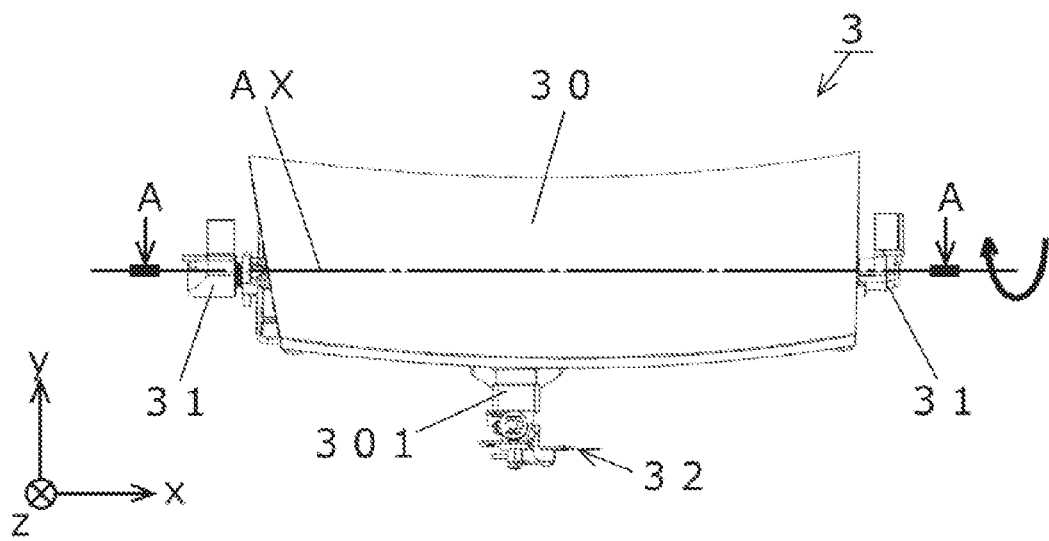
FIG. 2 is a front view illustrating the configuration of a reflecting mirror 3 of the head-up display device H1.
Figure 3:
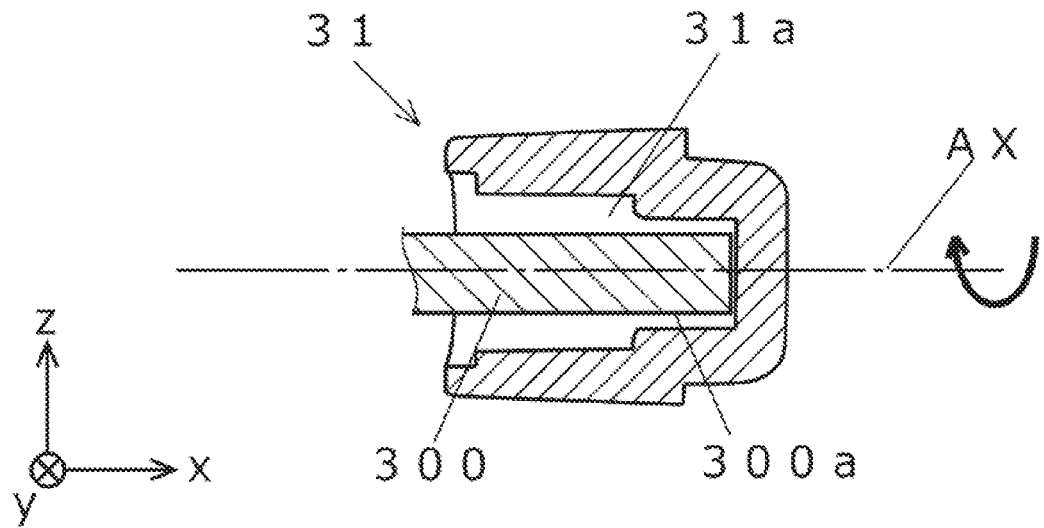
FIG. 3 is a cross-sectional view taken along the line A-A, illustrating the support structure of the reflecting mirror 3 of the head-up display device H1.

As shown in FIG. 2 and FIG. 3, the reflecting mirror 3 mainly includes the base member 30 including the reflecting surface, a support member 31 supporting the base member 30, and a drive member 32 configured to rotate the base member 30 supported by the support member 31.

The base member 30 includes a cylindrical shaft portion 300 supported by the support member 31 and an operation portion 301 configured to transmit driving force of the drive member 31 to the base member 30. The base member 30, the shaft portion 300, and the operation portion 301 are integrally formed by injection molding with a resin material.

The support member 31 is molded by injection molding with a resin material.

The shaft portion 300 of the base member 30 and the support member 31 supporting the shaft portion 300 include sliding surfaces 300a, 31a that make contact with each other. Tool marks (recesses and protrusions) TM1, TM2 as marks generated as a result of cutting or grinding an injection molding mold are respectively formed on the sliding surfaces 300a, 31a. The tool marks TM1, TM2 are fine recesses and protrusions; however, if the tool marks TM1, TM2 do not extend along a trajectory in which the reflecting mirror 3 moves, sliding performance may deteriorate during the movement of the reflecting mirror 3 and thus abnormal noise may be generated during the movement of the reflecting mirror 3.

Figure 4:
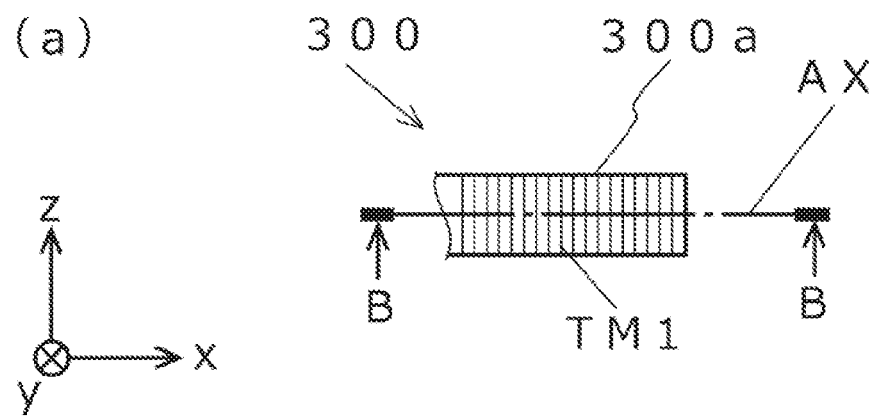
FIG. 4 is a top view illustrating a first sliding surface 300a of the reflecting mirror 3 of the head-up display device H1 and a cross-sectional view taken along the line B-B. (a) illustrates the top view and (b) illustrates the cross-sectional view taken along the line B-B.
Figure 4:
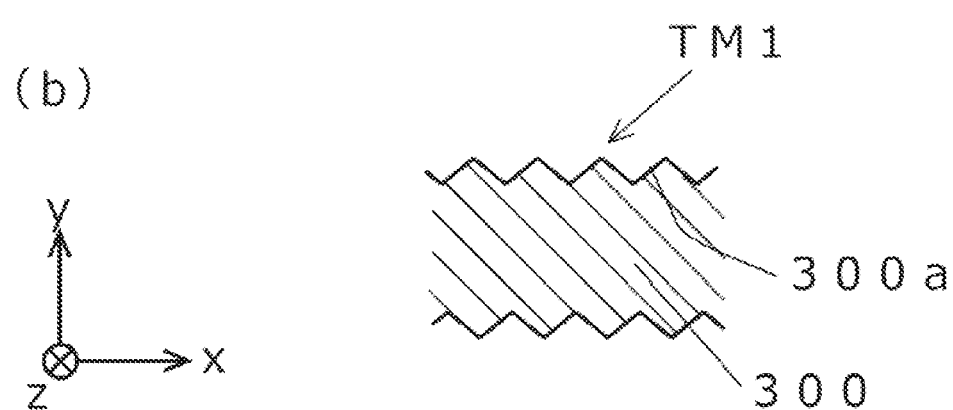

As shown in FIG. 4, the tool mark TM1 on the sliding surface (a first sliding surface) 300a of the shaft portion 300 includes the recesses and protrusions that linearly extend in a rotation direction having an axis as the rotation axis AX of the reflecting mirror 3. Also, the tool mark TM1 is formed periodically at predetermined intervals in a direction perpendicular to the rotation direction of the reflecting mirror 3. An arithmetic average roughness of the tool mark TM1 in the direction perpendicular to the rotation direction is defined as a value below 10 µm.

Figure 5:
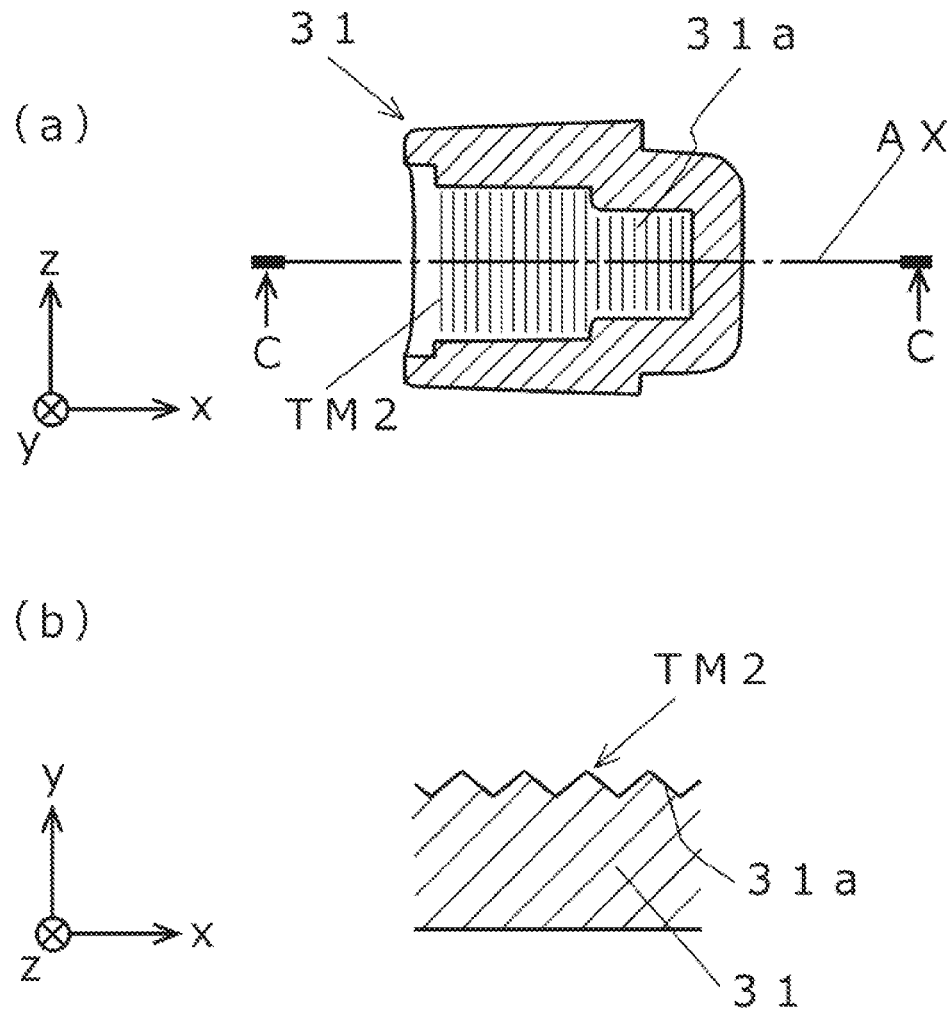
FIG. 5 is a top view illustrating a second sliding surface 31a of the reflecting mirror 3 and a cross-sectional view taken along the line C-C. (a) illustrates the top view and (b) illustrates the cross-sectional view taken along the line B-B.

As shown in FIG. 5, the tool mark TM2 on the sliding surface (a second sliding surface) 31a of the support member 31 includes the recesses and protrusions that extend in the rotation direction having the axis as the rotation axis AX of the reflecting mirror 3. Also, the tool mark TM2 is formed periodically at predetermined intervals in the direction perpendicular to the rotation direction of the reflecting mirror 3. An arithmetic average roughness of the tool mark TM1 in the direction perpendicular to the rotation direction is defined as a value below 10 µm.

The drive member 32 includes, for example, a motor rotating and a ball screw configured to convert a rotational movement of the motor into a parallel movement. The drive member 32 moves the operation portion 301 parallel in the z-axis direction perpendicular to the rotation axis AX and thereby the reflecting mirror 3 is rotated about the rotation axis AX.

Also, the reflecting mirror 3 includes a pressing member configured to be pressed in a direction toward a contact surface of the sliding surface 300a of the shaft portion 300 with the sliding surface 31a of the support member 31. The pressing member (not shown) is, for example, a plate spring, and looseness between the shaft portion 300 and the support member 31 is eliminated by the pressing member and therefore the occurrence of abnormal noise due to vibration can be inhibited.

As described above, the head-up display device H1 according to the first embodiment includes the display 1 configured to emit the display light L, the moving part 30 on which the first sliding surface 300a is formed, and the support member 31 on which the second sliding surface 31a that makes contact with the first sliding surface 300a is formed and which supports the moving part 30 so that the moving part 30 is rotatable. The head-up display device H1 is configured to display the vehicle information as the virtual image from the display light L. The recesses and protrusions TM1, TM2 linearly extending along the trajectory in which the moving part 30 moves are formed on the first sliding surface 300a and/or the second sliding surface 31.

With such a configuration, the sliding performance between the moving part 30 and the support member 31 supporting the moving part 30 is improved.

Second Embodiment

Figure 6:
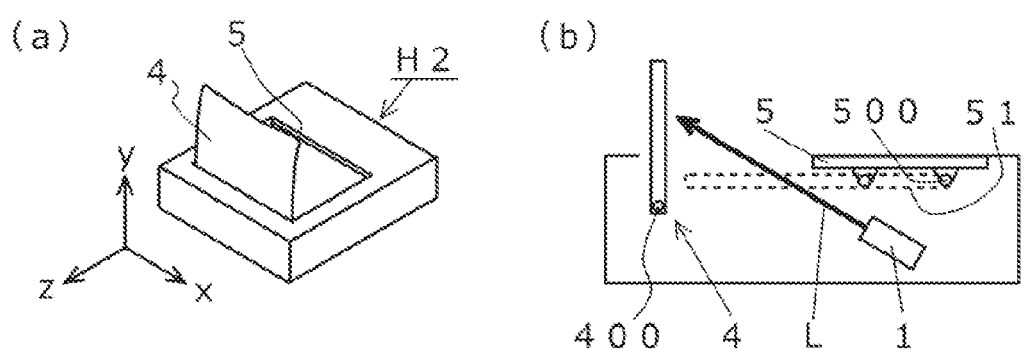
FIG. 6 is a perspective view and a schematic configuration diagram illustrating the configuration of a head-up display device H2 according to a second embodiment of the present invention. (a) illustrates the perspective view and (b) illustrates the schematic configuration diagram.
Figure 7:
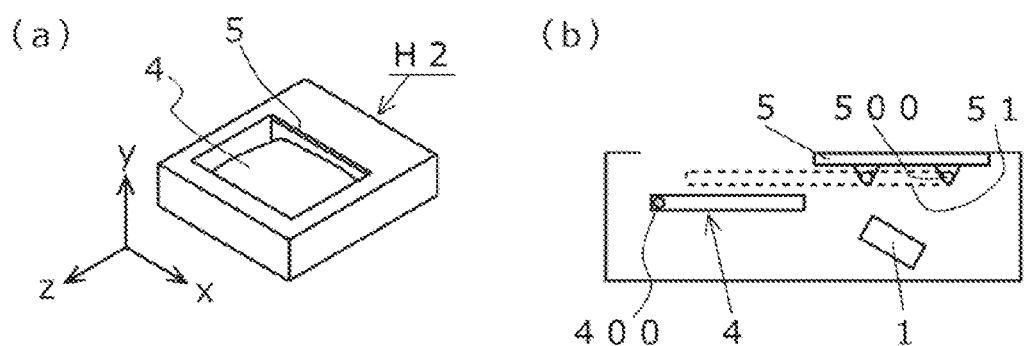
FIG. 7 is a perspective view and a schematic configuration diagram illustrating the configuration of the head-up display device H2. (a) illustrates the perspective view and (b) illustrates the schematic configuration diagram.
Figure 8:
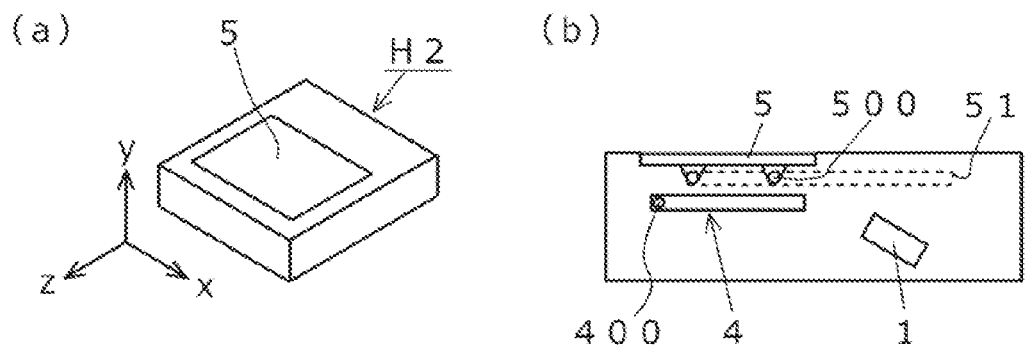
FIG. 8 is a perspective view and a schematic configuration diagram illustrating the configuration of the head-up display device H2. (a) illustrates the perspective view and (b) illustrates the schematic configuration diagram.

As shown in FIGS. 6 to 8, the head-up display device H2 includes the display 1 configured to emit the display light L, a combiner 4 configured to receive the display light L and display a virtual image, and a cover member 5 as a cover of a housing of the head-up display H2.

The combiner 4 is a half mirror obtained by forming a semi-transmissive reflecting layer on a primary surface (for receiving the display light L) of transmissive resin such as polymethyl methacrylate (PMMA) resin formed in a plate-shape having a curved surface. The combiner 4 including a cylindrical shaft portion 400 is configured to be rotatable around the shaft portion 400 as a rotation axis.

The combiner 4 is configured to be movable between two conditions where, as shown in FIG. 6, the combiner 4 is in a stand-up position and protruded outward of the housing of the head-up display device H2 and where, as shown in FIG. 7 and FIG. 8, the combiner 4 is in a fallen down position and stored in the housing of the head-up display device H2.

A sliding surface of the shaft portion 400 of the combiner 4 and a sliding surface of a support portion (not shown) supporting the shaft portion 400 are configured to make contact with each other and are formed, in the same way as the tool marks TM1, TM2 formed on the shaft portion 300 and the support portion 31 of the reflecting mirror 3 in the first embodiment, as recesses and protrusions that extend along a trajectory in which the combiner 4 moves.

In a state where the combiner 4 is in a stand-up position and protruded outward of the housing of the head-up display device H2 as shown in FIG. 6, the cover member 5 moves to a position in which the cover of the housing is open. In a state where the combiner 4 is in a fallen down position and stored in the housing of the head-up display device H2 as shown in FIG. 7 and FIG. 8, the cover member 5 moves to a position in which the cover of the housing is closed. That is, the moving part according to the present invention is not limited to the reflecting mirror and can be applied to the combiner.

A sliding surface of a shaft portion 500 of the cover member 5 and a sliding surface of a support portion 51 supporting the shaft portion 500 are configured to make contact with each other and are formed, in the same way as the tool marks TM1, TM2 formed on the shaft portion 300 and the support portion 31 of the reflecting mirror 3 in the first embodiment, as recesses and protrusions that extend along a trajectory in which the cover member 5 moves. That is, the movement according to the present invention is not limited to a rotation and may include a parallel movement.

As described above, the configuration of the head-up display device H1 according to the first embodiment of the present invention and the configuration of the head-up display device H2 according to the second embodiment of the present invention have been described. The present invention is not limited by the foregoing embodiments (including the contents of the drawings). Changes (including the elimination of elements) can be made to the foregoing embodiments within the scope of the present invention.

The moving parts in the foregoing embodiments are configured as members that are injection-molded with a resin material, and the tool marks TM1, TM2 are formed on the moving parts by marks generated as a result of cutting or grinding an injection molding mold; however, the moving parts are not limited to such a configuration. A moving part and a support member supporting the moving member may be made of metal, and the metal may be cut or grinded to form tool marks.

INDUSTRIAL APPLICABILITY

The present invention is applicable to a head-up display device installed in a vehicle.

DESCRIPTION OF REFERENCE NUMERALS

H1, H2: Head-up display device
1: Display
2: Reflecting mirror
3: Reflecting mirror
30: Base member (moving part)
300: Shaft portion
300a: First sliding surface
TM1: Tool mark (recesses and protrusions)
31: Support member
31a: Second sliding surface
TM2: Tool mark (recesses and protrusions)
32: Drive member
4: Combiner (moving part)
5: Cover member (moving part)

The invention claimed is:

1. A head-up display device comprising:
a display that emits display light;
a moving part on which a first sliding surface is formed; and
a support member on which a second sliding surface that makes contact with the first sliding surface is formed, the support member supporting the moving part so that the moving part is movable,
the head-up display device being configured to display vehicle information as a virtual image from the display light,
wherein recesses and protrusions that extend along a trajectory in which the moving part moves are formed on the first sliding surface and/or the second sliding surface.

2. The head-up display device according to claim 1, wherein the recesses and protrusions are formed periodically at predetermined intervals in a direction perpendicular to the trajectory in which the moving part moves.

3. The head-up display device according to claim 2, wherein the recesses and protrusions are configured such that an arithmetic average roughness in the direction perpendicular to the trajectory in which the moving part moves is below 10 μm.

4. The head-up display device according to claim 1, wherein the recesses and protrusions are cutting marks or grinding marks.

5. The head-up display device according to claim 4, wherein a resin material is injection-molded into a mold on which the cutting marks or the grinding marks are formed, and therefore the recesses and protrusions are formed.

* * * * *